United States Patent
Zhong et al.

(10) Patent No.: US 10,541,879 B2
(45) Date of Patent: Jan. 21, 2020

(54) MULTI-CHANNEL RESOURCE CONTROL SYSTEM

(71) Applicant: Microsoft Technology Licensing, LLC, Redmond, WA (US)

(72) Inventors: Mingyuan Zhong, Sunnyvale, CA (US); Dayun Li, Sunnyvale, CA (US); Jie Xiao, Sunnyvale, CA (US); Zhifeng Deng, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 778 days.

(21) Appl. No.: 15/224,222

(22) Filed: Jul. 29, 2016

(65) Prior Publication Data

US 2018/0034745 A1    Feb. 1, 2018

(51) Int. Cl.
*H04L 12/24* (2006.01)
*H04L 12/26* (2006.01)
*H04L 12/725* (2013.01)

(52) U.S. Cl.
CPC .......... *H04L 41/145* (2013.01); *H04L 41/147* (2013.01); *H04L 43/0817* (2013.01); *H04L 45/306* (2013.01)

(58) Field of Classification Search
CPC .......... G06F 9/5011; G06F 2209/5019; G06F 2009/45583; H04L 43/028; H04L 47/20; H04L 41/145; H04L 41/147; H04L 47/762; H04L 47/822; H04W 28/0268; H04W 48/18

See application file for complete search history.

(56) References Cited

U.S. PATENT DOCUMENTS

| | | | | | |
|---|---|---|---|---|---|
| 8,041,806 | B2* | 10/2011 | Gassewitz | ............. | G06Q 30/02 709/224 |
| 8,413,205 | B2* | 4/2013 | Carney | ............. | H04N 5/44543 725/135 |
| 8,732,368 | B1* | 5/2014 | Jouppi | ................ | G06F 12/0862 710/240 |
| 9,043,422 | B2* | 5/2015 | Zhang | ................ | G06Q 30/0269 709/206 |
| 9,706,052 | B2* | 7/2017 | Bhatia | ................ | H04M 3/5191 |
| 10,003,837 | B2* | 6/2018 | Joglekar | .......... | H04N 21/44204 |
| 10,135,984 | B2* | 11/2018 | Bhatia | ................. | H04M 3/5191 |
| 10,349,106 | B1* | 7/2019 | Whitehead | ......... | H04N 21/2668 |
| 2007/0027771 | A1* | 2/2007 | Collins | ............. | G06Q 10/0631 705/14.48 |

(Continued)

*Primary Examiner* — Sargon N Nano
(74) *Attorney, Agent, or Firm* — Hickman Palermo Becker Bingham LLP; Daniel D. Ledesma (57) ABSTRACT

A system for conserving resources in a multi-channel control system environment is provided. A resource limit that is associated with a content delivery campaign is determined. A prediction of resource usage that is associated with the content delivery campaign and a first content delivery channel is determined. A content request is received through a second content delivery channel that is different than the first content delivery channel. In response, based on data contained within the content request, the content delivery campaign is identified. Also, based on the resource limit and the prediction of resource usage associated with the content delivery campaign and the first content delivery channel, it is determined whether to respond to the content request with data associated with the content delivery campaign.

20 Claims, 3 Drawing Sheets

(56) References Cited

U.S. PATENT DOCUMENTS

| | | | |
|---|---|---|---|
| 2009/0177526 A1* | 7/2009 | Aaltonen | G06Q 30/02 |
| | | | 705/59 |
| 2014/0040008 A1* | 2/2014 | Belani | G06Q 30/02 |
| | | | 705/14.41 |
| 2015/0254108 A1* | 9/2015 | Kurtzman | G06F 9/5016 |
| | | | 718/104 |
| 2015/0256476 A1* | 9/2015 | Kurtzman | G06F 16/24578 |
| | | | 709/226 |
| 2016/0127802 A1* | 5/2016 | Carney | G06Q 30/02 |
| | | | 725/14 |
| 2017/0048390 A1* | 2/2017 | Bhatia | H04M 3/5191 |
| 2019/0068786 A1* | 2/2019 | Bhatia | H04M 3/5191 |

* cited by examiner

┌─────────────────────────────────────────────────────────────┐
│                            210                              │
│  A RESOURCE LIMIT THAT IS THAT IS ASSOCIATED WITH A CONTENT │
│              DELIVERY CAMPAIGN IS STORED                    │
└─────────────────────────────────────────────────────────────┘
                               ↓
┌─────────────────────────────────────────────────────────────┐
│                            220                              │
│  DETERMINE A PREDICTION OF RESOURCE USAGE THAT IS           │
│  ASSOCIATED WITH THE CONTENT DELIVERY CAMPAIGN AND A        │
│  FIRST CONTENT DELIVERY CHANNEL                             │
└─────────────────────────────────────────────────────────────┘
                               ↓
┌─────────────────────────────────────────────────────────────┐
│                            230                              │
│  ALLOCATE AN AMOUNT OF RESOURCES TO A SECOND CONTENT        │
│  DELIVERY CHANNEL THAT HAS A LOWER PRIORITY THAN THE        │
│  FIRST CONTENT DELIVERY CHANNEL                             │
└─────────────────────────────────────────────────────────────┘
                               ↓
┌─────────────────────────────────────────────────────────────┐
│                            240                              │
│                   RECEIVE A CONTENT REQUEST                 │
└─────────────────────────────────────────────────────────────┘
                               ↓
┌─────────────────────────────────────────────────────────────┐
│                            250                              │
│  IDENTIFY THE CONTENT DELIVERY CAMPAIGN IN RESPONSE TO      │
│             RECEIVING THE CONTENT REQUEST                   │
└─────────────────────────────────────────────────────────────┘
                               ↓
┌─────────────────────────────────────────────────────────────┐
│                            260                              │
│  DETERMINE WHETHER TO RESPOND TO THE CONTENT REQUEST        │
│  WITH DATA ASSOCIATED WITH THE CONTENT DELIVERY CAMPAIGN    │
│  BASED ON THE ALLOCATED RESOURCES AND A CURRENT             │
│  RESOURCE USAGE OF THE SECOND CHANNEL                       │
└─────────────────────────────────────────────────────────────┘
```

… # MULTI-CHANNEL RESOURCE CONTROL SYSTEM

TECHNICAL FIELD

The present disclosure relates to conserving resources in a resource-constrained, multi-channel control system environment.

BACKGROUND

The Internet has enabled the delivery of electronic content to billions of people. Such delivery can be made through many different channels. Even the same content may be delivered to many end-users through different channels. Some entities maintain content delivery exchanges that allow different content providers to reach a wide online audience. There is a limit to the resources that are dedicated to each content delivery campaign that a content provider establishes with a content delivery exchange. It is imperative that a content delivery exchange not exceed the resource limit of any content delivery campaign. However, this imperative is difficult to implement intelligently due to the nature of some content delivery channels. For example, some content delivery channels are not guaranteed in the sense that online traffic through those channels may vary widely. In contrast, other channels, such as email, are fixed and guaranteed. For example, if there are resources to send a thousand emails to a thousand email addresses, then those emails are sent. There is a need to manage resources effectively for content delivery channels whose online traffic constantly fluctuates.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for allocating resources to one or more content delivery channels is provided. In one approach, a prediction of resource usage (by a content delivery campaign) of a higher priority content delivery channel is calculated. The prediction of resource usage may be calculated based on prior usage of the higher priority content delivery channel, the day of the week, and attributes of the content delivery campaign. Then, an allocated resource usage (by the content delivery campaign) of a lower priority content delivery channel is calculated based on the prediction.

System Overview

Figure 1:
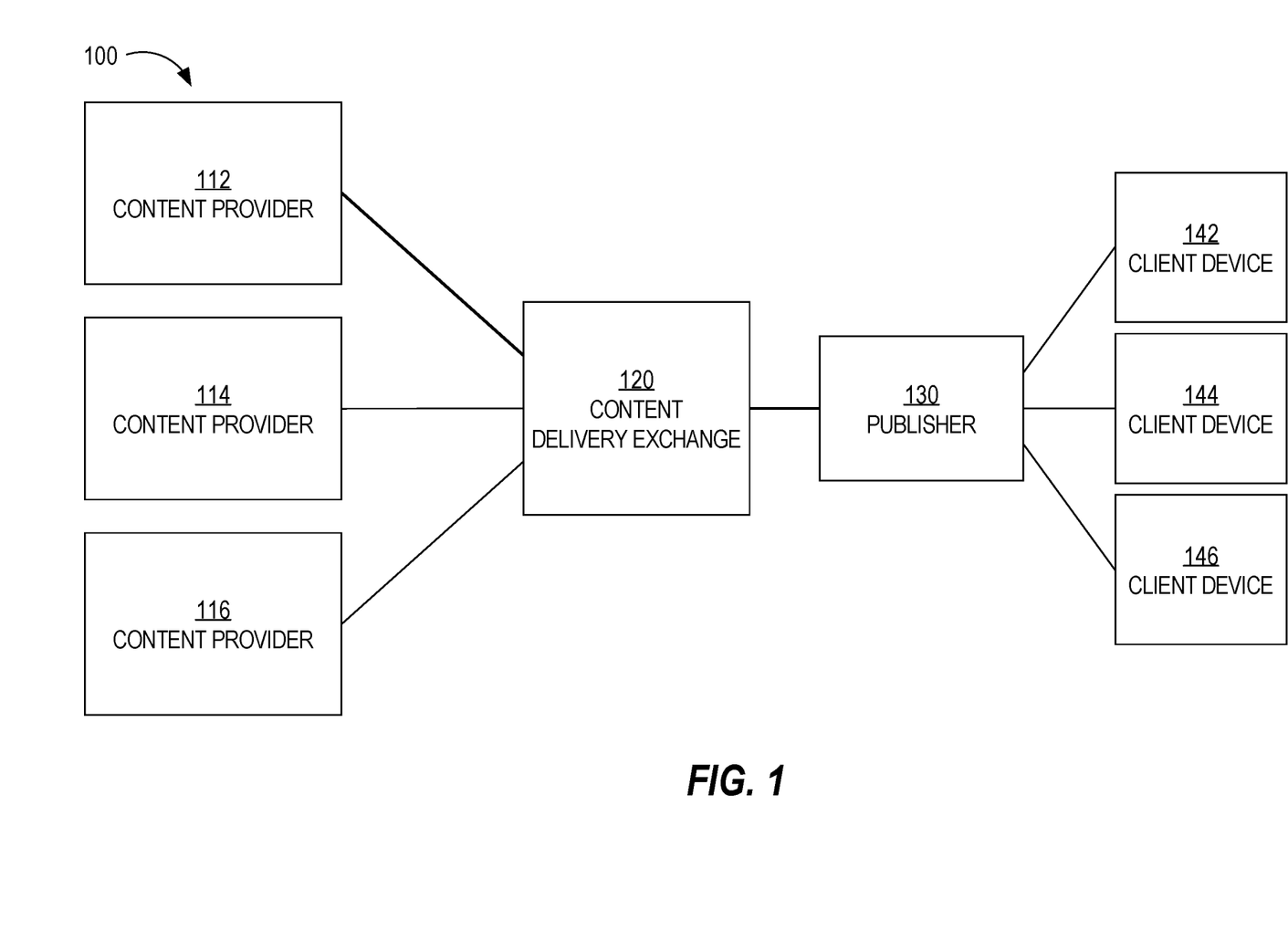
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112, unless a target audience specified by content provider 112 is small enough.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that users.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), current geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Instead of one set of targeting criteria, the same content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different compensation schemes. For example, one content delivery campaign may compensate content delivery exchange 120 for each presentation of a content item from the content delivery campaign (referred to herein as cost per impression or CPM). Another content delivery campaign may compensate content delivery exchange 120 for each time a user interacts with a content item from the content delivery campaign, such as selecting or clicking on the content item (referred to herein as cost per click or CPC). Another content delivery campaign may compensate content delivery exchange 120 for each time a user performs a particular action, such as purchasing a product or service, downloading a software application, or filling out a form (referred to herein as cost per action or CPA). Content delivery exchange 120 may manage only campaigns that are of the same type of compensation scheme or may manage campaigns that are of any combination of the three types of compensation scheme.

Tracking User Interaction

Content delivery exchange 120 tracks one or more types of user interaction across client devices 142-146. For example, content delivery exchange 120 determines whether a content item that exchange 120 delivers is displayed by a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of user selection, a time of the user selection, a particular publisher or source (e.g., onsite v. offsite), a particular client device that displayed the specific content item, and/or a user identifier of a user that operates the particular client device.

Resource Limit

In an embodiment, a content delivery campaign is associated with a resource limit. The resource limit may be a default value, a value specified by the content provider of the content delivery campaign, or a value specified by a representative of content delivery exchange 120. The resource limit dictates whether a content item associated with the content delivery campaign is a candidate for transmission in response to a content request. For example, if actual resource usage of the content delivery campaign is equal to or greater than the resource limit, then the content delivery campaign (or its associated content item(s)) is not a candidate when processing a content request.

Example resources include computing resources (e.g., CPU, memory, network I/O, and storage I/O) and monetary resources. If the latter, then the monetary resources represent an amount that a content provider is willing to spend on the corresponding content delivery campaign. Content delivery exchange 120 may receive a portion of the monetary resources, but must ensure that those monetary resources are not exceeded; else, content delivery exchange 120 is forfeiting either actual or potential compensation if content delivery exchange 120 continues to respond to content requests with content items from the content delivery campaign whose associated or allocated resources have been depleted or used up. If transmitting content items associated with the content delivery campaign to offsite sources or content delivery channels, content delivery exchange 120 may share in the monetary resources with the offsite sources.

At least for content delivery campaigns that have a resource limit, content delivery exchange 120 maintains a current resource usage of the entire campaign and, optionally, of individual content delivery channels. For example, the resource limit of a particular content delivery campaign may be 80 units, a current resource usage of the campaign is 65 units, a current resource usage of the campaign through channel C1 is 39 and a current resource usage of the campaign through C2 is 26. For each content delivery campaign (or at least for ones that are deemed important), content delivery exchange 120 updates (e.g., in near real-time) the current resource usage of the campaign based on user interaction data items (e.g., impression data items and/or click data items) that exchange 120 receives and that pertain to the campaign.

Content Delivery Channels

A content delivery channel is a source of content requests, regardless of where content delivery exchange 120 actually receives the content requests. Thus, content delivery exchange 120 may receive all content requests through the same set of ports or computing devices but the sources of those content requests are different. For example, one source of content requests may be a social networking platform (which may be shared with content delivery exchange 120) from which the content requests originate. Such a source may be considered an "onsite" source or content delivery channel. Another source of content requests may be any publisher or other content exchange that transmits content requests to content delivery exchange 120. Such sources may be considered an "offsite" sources or content delivery channels. Examples of specific offsite content delivery channels include any publisher (e.g., Facebook, a news website) or another content exchange that interacts directly with one or more publishers. As another example, "source" may refer to a segment of a target audience. For example, one source of content requests is a set of members of a social networking service who satisfy certain criteria (e.g., they are classified as business professionals) while another source of content requests is a set of members of the social networking service who do not satisfy the certain criteria.

Additionally or alternatively, a content delivery channel is a communication channel through which content requests are received. For example, one content delivery channel comprises a first set of one or more computing (e.g., server) devices through which content requests are received while another content delivery channel comprises a second set of one or more computing devices through which content requests are received. As another example, one content delivery channel comprises a first set of one or more (computer) ports (on one or more computing devices) through which content requests are received while another content delivery channel comprises a second set of one or more ports (on the same or different one or more computing devices) through which content requests are received. In a related embodiment, content requests from different sources are received through or at different ports and/or computing devices. For example, content requests from one source are received through one set of ports and content requests from another source are received through another set of ports.

An offsite source may not guarantee the delivery of a content item that content delivery exchange 120 transmits to the offsite source in response to a content request from the offsite source. In this scenario, content delivery exchange 120 acts as a bidder. The offsite source may receive multiple content items from multiple bidders (content delivery exchange 120 being one of them) and choose only a subset (e.g., one content item) to delivery to a computing device of an end-user, which computing device initiated the content request to content delivery exchange 120.

Higher Priority Content Delivery Channels

In an embodiment, content delivery channels are prioritized, such that a higher priority content delivery channel ("HPCDC") is allocated more resources than a lower priority content delivery channel ("LPCDC"). In offline content delivery systems, such as email marketing, allocating budget to different content delivery channels and prioritizing spending based on a fixed order is straightforward and guaranteed. In contrast, in an online content delivery system, when serving to different content delivery channels, content delivery is not guaranteed in any content delivery channel. One approach is to attempt to balance, as close as possible, resource usage across multiple content delivery channels. Thus, if resource usage through a first content delivery channel becomes significantly higher than resource usage through a second content delivery channel, then subsequent content requests from the first content delivery channel are throttled until there is a rough equality in resource usage through the two content delivery channels. However, this approach does not take into account priority among content delivery channels.

Because content delivery channels are prioritized, to the extent that content requests are throttled for a particular content delivery campaign, primarily content requests from a LPCDC are throttled, unless there is a large spike in content requests (from a HPCDC) that is not accounted for. In the case of a large spike of content requests from a HPCDC, resources allocated to the particular content delivery campaign may be exceeded before the allocation cycle is finished (e.g., a daily budget or a total amount of resources provided by the corresponding content provider to the particular content delivery campaign). Thus, content requests from the HPCDC may be throttled, but that problem is acceptable since the alternative is throttling (with respect to the particular content delivery campaign) many more content requests from the HPCDC.

In an embodiment, a HPCDC for one content delivery campaign is a LPCDC for another content delivery campaign. Thus, a HPCDC might not be universal for all campaigns that content delivery exchange 120 manages.

A priority among content delivery channels may be specified by a user or representative of the entity that owns and manages content delivery exchange 120 or by a user or representative of a content provider. In the latter case, content delivery exchange 120 may have a default setting that indicates a priority among content delivery channels and a user or representative of a content provider may modify that setting to indicate a different priority.

In an embodiment, a priority among content delivery channels (whether pertaining to a single content delivery campaign or multiple content delivery campaigns) changes automatically based on inputs to content delivery exchange 120. For example, content delivery exchange may determine that a lot of high quality user interaction is coming through a LPCDC and that the LPCDC should be changed to a HPCDC. Such a change may occur while a content delivery campaign is active. For example, the first 19 days of a campaign, channel C1 has a higher priority relative to channel C2. After the first 19 days and based on analysis of user interaction data, it is determined that channel C2 should have a higher priority. As a result, a prediction of resource usage of the channel C2 is made and used for one or more content requests after the first 19 days.

Prediction

To ensure priority among content delivery channels, a prediction of resource usage, by a particular content delivery campaign, through a HPCDC, is determined. A content request from a LPCDC triggers a check to determine if actual resource usage associated with the LPCDC is greater than or equal to an allocated resource usage associated with the LPCDC, where the allocated resource usage is (e.g., roughly) a difference between a resource limit (or total resource allocation across multiple content delivery channels, including the HPCDC and the LPCDC) associated with the content delivery campaign and the prediction of resource usage (associated with the HPCDC).

A prediction of resource usage by a content delivery campaign relative to a HPCDC may be determined or calculated in a number of ways and may be based on multiple factors. Example factors include metadata of the content delivery campaign, historical data related to resource usage by the content delivery campaign relative to a HPCDC, a day of the week, geography of the targeted segment of users, and a protection that is based on a hard threshold on a LPCDC.

Examples of metadata of a content delivery campaign include type of creative associated with the campaign (e.g., sponsored update, text ad, dynamic ad), pricing model (e.g., CPM, CPC, CPA), geography, creation date, and type of campaign provider.

Regarding historical data, such data may include actual resource usage (associated with a particular content delivery campaign) over a particular period of time, such as the last 14 days. If historical data is limited (e.g., just a few days of resource usage data), then the historical data might not be used. In cases where historical data is used to generate a prediction, each data point (e.g., corresponding to a day's worth of resource usage data) may be treated equally. Alternatively, each data point may be associated with a weight that either increases or decreases that data point relative to other data points. For example, the most recent resource usage data point (e.g., the previous day) may be weighted higher than the least recent resource usage data point (e.g., 14 days ago). An example formula for generating a prediction based on historical data is as follows:

$$\text{Prediction} = a\_1 * \text{Actual\_1dayago} + a\_2 * \text{Actual\_2daysago} + \ldots + a\_k * \text{Actual\_}n\text{daysago} + b\_k * \text{isDayOfWeekIsK}$$

where b_k*isDayOfWeekIsK is used to take into account the day of the week effect. ("isDayOfWeekIsK" may be a 0 or a 1, depending on the day of the week.) For example, a HPCDC may tend to be lower (relative to a LPCDC) on weekends than on weekdays. Thus, in this example, the value of b_k*isDayOfWeekIsK may be negative if the prediction is for a weekend, while the value of b_k*isDayOfWeekIsK may be positive if the prediction is for a weekday.

In a related embodiment, if historical data of a particular content delivery campaign is limited or not available (e.g., because the campaign has not yet commenced or the campaign recently commenced), then historical data of "similar" content delivery campaigns is used. A "similar" content delivery campaign may be one that has the exact same characteristics as the particular content delivery campaign (e.g., campaign type, same content, same geography, same target segment), only run in the past. As another example, a "similar" content delivery campaign may be one that was initiated by the same content provider that initiated the particular content delivery campaign, but which may have more characteristics that are different, such as a different target audience, different geography, and/or different content. As another example, a "similar" content delivery campaign may be one that was initiated by a different content provider than the one that initiated the particular content delivery campaign, but which may have some characteristics that are the same, such as the same industry, same campaign type, a similar target audience, and/or similar geography.

A prediction of resource usage may be based on one or more of the above factors. For example, the prediction may be a value that is generated based on only historical data of the content delivery campaign, such as a weighted average of the last 14 days. As another example, the prediction may be based on historical data, a day of week, and geography of the targeted segment of users, the latter two of which may be positive or negative factors (depending on their actual values) that are applied to a result of combining the historical data.

Example Process

Figure 2:
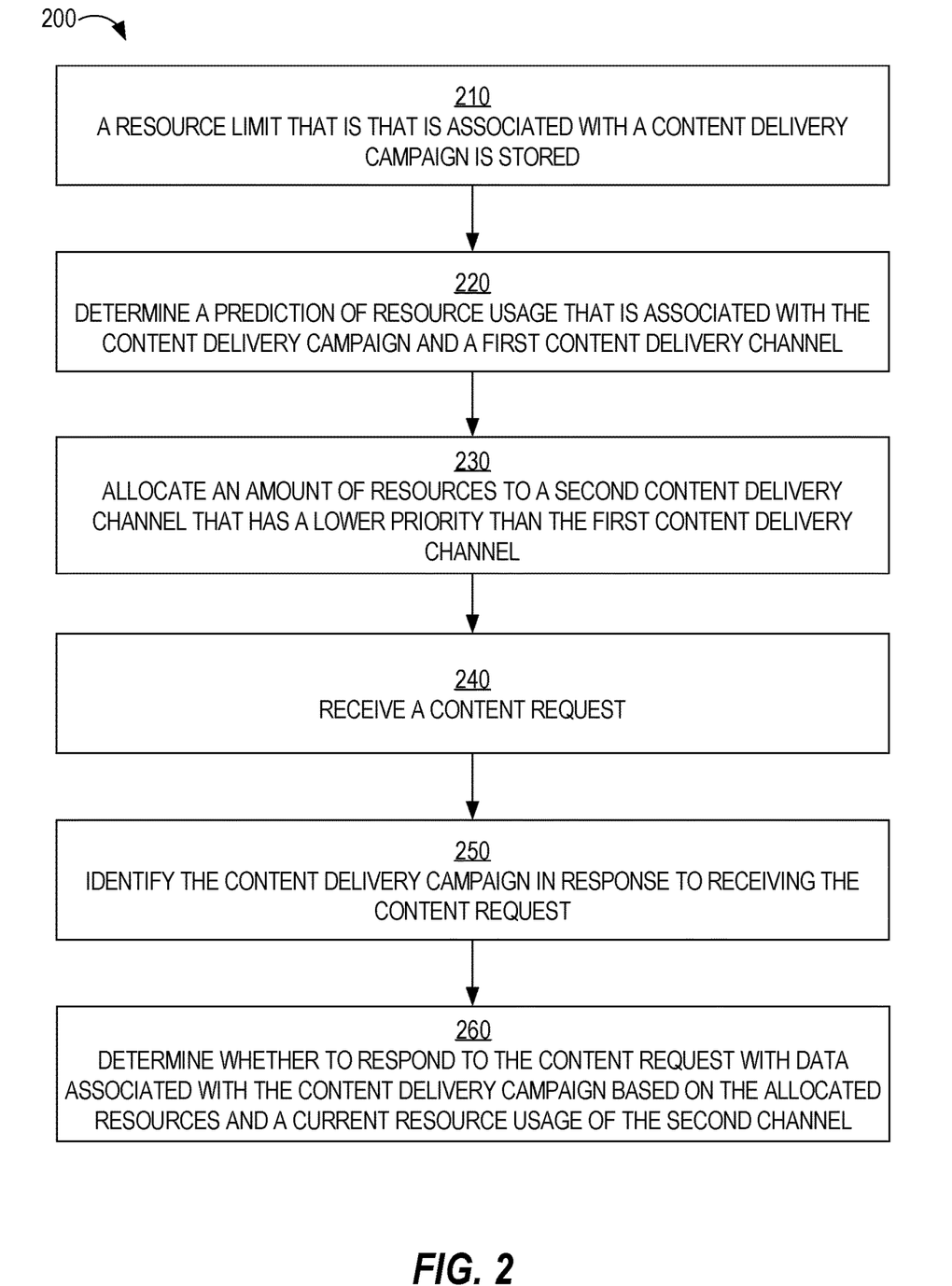
FIG. 2 is a flow diagram that depicts a process for responding to a content request, in an embodiment.

FIG. 2 is a flow diagram that depicts a process 200 for responding to a content request, in an embodiment. Process 200 may be implemented by content delivery exchange 120.

At block 210, a resource limit that is associated with content delivery campaign is stored. The resource limit may be a default value, may have been specified by a representative of content delivery exchange 120, or may have been specified by the content provider (e.g., content provider 112) that initiated the content delivery campaign. The content delivery campaign may be one of many content delivery campaigns that are presently managed by content delivery exchange 120.

At block 220, a prediction of resource usage that is associated with the content delivery campaign and a first content delivery channel is determined. Block 220 may involve generating the prediction of resource usage and then storing the prediction for subsequent content requests.

At block 230, an amount of resources is allocated to a second content delivery channel that is different than the first content delivery channel and has a lower priority than the first content delivery channel. The allocated amount is based on the prediction of resource usage determined in block 220. Block 230 may involve subtracting the prediction of resource usage (through the first content delivery channel) from the resource limit.

At block 240, a content request is received from (or through) the second content delivery channel. The content request may come from publisher 130, another publisher (not depicted), or from client devices 142-146.

At block 250, in response to receiving the content request, the content delivery campaign is identified based on data contained within the content request. Block 250 may involve identifying one or more other content delivery campaigns as candidate campaigns. Each of the other content delivery campaigns may be associated with their respective resource limit and a prediction of resource usage for their HPCDC.

If this is the first content request received for this content delivery campaign or the first content request received for this content delivery campaign during the present time period (e.g., day), then block 230 may be performed subsequent to block 240.

At block 260, it is determined whether to respond to the content request with data associated with the content delivery campaign (e.g., an advertisement) based on the allocated amount of resources, a current resource usage of the second content delivery channel, and, optionally, a current resource usage of the first content delivery channel. For example, if the allocated amount of resources is 75 units and the current resource usage is 50, then the content request is processed and one or more content items that might be relevant to the end-user are identified and returned. As another example, if the allocated amount of resources is 75 units and the current resource usage is 77, then the content request may be ignored. If system 100 is a real-time system where usage data is constantly being tracked and updated and content requests are constantly being received and processed, then there is a possibility that the current resource usage of a content delivery channel will exceed the allocated amount of resources for that channel.

While FIG. 2 depicts process 200 being performed in a particular order, process 200 may be performed in a different order. For example, blocks 220 and 230 may occur after block 240.

Machine Learning Approach

In an embodiment, machine learning is used to generate a mathematical model that is used to predict resource usage of a content delivery campaign with respect to a particular content delivery channel. Machine learning is a subfield of computer science that evolved from the study of pattern recognition and computation learning theory in artificial intelligence. Machine learning explores the study and construction of algorithms that can learn from and make predictions on data. Such algorithms operate by building a model from an example training set of input observations in order to make data-driven predictions or decisions expressed as outputs, rather than following strictly static program instructions.

Machine learning is employed in a range of computing tasks where designing and programming explicit algorithms is unfeasible. Example applications include spam filtering, optical character recognition (OCR), search engines and computer vision.

Within the field of data analytics, machine learning is a method used to devise complex models and algorithms that lend themselves to prediction. These analytical models allow researchers, data scientists, engineers, and analysts to "produce reliable, repeatable decisions and results" and uncover "hidden insights" through learning from historical relationships and trends in the data.

Any machine learning technique may be used to generate the mathematical model, such as regression, which includes linear regression, ordinary least squares regression, and logistic regression.

In an embodiment, the mathematical model is generated based on a training set that includes data from each of multiple content delivery campaigns, including actual (previous) resource usage and one or more attributes or characteristics of the content delivery campaign that corresponds to the actual resource usage. Example attributes or characteristics include historical data, campaign type, geography of targeted audience, day of the week of the predicted resource usage, industry associated with the campaign, and characteristics of users in the target audience. The mathematical model is used to generate, for a particular content delivery campaign, a prediction of resource usage given a set of characteristics of the particular content delivery campaign, even though the exact characteristics of the particular content delivery campaign may not have been shared with any content delivery campaign upon which the mathematical model is based. The prediction of resource usage may be for the entire duration of the campaign or a portion of the campaign's duration, such as a particular day or a particular week.

The units of a prediction of resource usage may vary depending on the units in the training set and the type of resource whose usage is being predicted. For example, if the resource is memory, then the units may be in megabytes. If the resource is monetary, then the units may be in dollars.

In an embodiment, multiple mathematical models are generated. For example, one mathematical model may be generated for content delivery campaigns of one campaign type (e.g., cost per impression or CPM) and another mathematical model may be generated for content delivery campaigns of another campaign type (e.g., cost per click or CPC). As another example, one mathematical model is generated for content delivery campaigns associated with one industry (e.g., related to software services) and another mathematical model is generated for content delivery campaigns associated with another industry (e.g., related to financial services). As another example, one mathematical model is generated for content delivery campaigns whose target audience is in one geographic region (e.g., the United States) and another mathematical model is generated for content delivery campaigns whose target audience is in another geographic region (e.g., India). As another example, one mathematical model is generated for campaigns for which historical data is available or there is sufficient historical data (e.g., more than 5 days) and another mathematical model is generated for campaigns for which no historical data is available or there is insufficient historical data (e.g., less than 6 days of actual usage data).

If multiple mathematical models are generated, then process 200 may involve selecting the appropriate mathematical model based on one or more characteristics of a content delivery campaign. Since content items may be provided in response to content delivery exchange 120 receiving a content request, each content item corresponding to a different content delivery campaign, then multiple mathematical models may have been leveraged to generate predictions of resource usage corresponding to the different content delivery campaigns. For example, model M1 is used to generate a prediction for campaign C1, model M2 is used to generate a prediction for campaigns C2 and C3, and model M3 is used to generate a prediction for campaign C4. Then, a content item from each of the four campaigns is provided to a client device in response to a single content request.

If a mathematical model is generated based on data from multiple content delivery campaigns that share a common set of one or more attributes or characteristics (e.g., campaign type, industry, geography, etc.), then that set of one or more attributes or characteristics are not used as feature(s) when training the mathematical model or when using the mathematical model to make a prediction.

Timing of Prediction Calculation

In an embodiment, a prediction of resource usage associated with a particular content delivery campaign (with respect to a HPCDC) is initially determined or calculated after a set of candidate content delivery campaigns (that includes the particular content delivery campaign) is identified in response to a content request. Once the prediction of resource usage is determined for the particular content delivery campaign, that prediction is provided to another (e.g., software) component, process, or module that is responsible for identifying the set of candidate content delivery campaigns.

In an embodiment, a prediction of resource usage associated with a content delivery campaign is re-used when determining a set of candidate content delivery campaigns in response to each of multiple subsequent content requests from a LPCDC. The re-using may persist until the content delivery campaign (with which the prediction is associated) is deactivated (e.g., due to total resource limit being reached) or until the next time period, such as the next day. For example, some content delivery campaigns have a daily resource limit that must not be exceeded. Such a scenario helps to space content delivery of a campaign over a longer period of time. Otherwise, the total resource limit may be reached in a short period of time, such as a day or two.

Such identifying may involve comparing attributes of a source of a content request and/or attributes of a user of a client device that initiated the content request to targeting criteria of each content delivery campaign of multiple campaigns. If there is an exact (or at least partial) match with respect to a content delivery campaign, then that content delivery campaign is added to the set of candidate content delivery campaigns.

The identifying of the set of candidate content delivery campaigns may also involve determining whether each of multiple content delivery campaigns has a frequency cap and, if so, whether the frequency cap has been reached. If so, then the content delivery campaign is not added to (or retained in) the set of candidate content delivery campaigns. An example of a frequency cap is "3 impressions or less per person (or user) per day." The time period could be any time period, even the entirety of the corresponding content delivery campaign. Also, the action (impressions in the above example) could be any action, including user actions, such as clicks, views, purchases, etc.

In an embodiment, once a set of candidate content delivery campaigns is identified, another component, process, or module ranks the set of candidate content delivery campaigns. The ranking may be based on predicted revenue or predicted amount of user interaction, such as clicks or views.

During this "ranking" stage, the prediction of resource usage (of each of one or more campaigns in the set of candidate campaigns) with respect to a HPCDC may be used. If it is determined, based on the prediction of resource usage of a particular content delivery campaign, that the allocated resource limit for the LPCDC has been exceeded, then the particular content delivery campaign is removed from the list.

One reason why computation of the prediction of resource usage may be delayed until after the set of candidate content delivery campaigns is identified is because the computation may take a significant amount of time. Thus, the computation may be performed by a separate component, process, thread, or module ("predictor") and the result provided to the "ranker."

In an embodiment, computation of a prediction of resource usage of a content delivery campaign is performed on a regular basis. For example, if a total resource limit resets or changes from day to day, then the predication of resource usage is computed at the beginning of each day. Thus, such a computation may be done independent of (i.e., not in response to) a content request from a LPCDC.

Prediction Buffer

Predictions of events whose outcomes are continuous values rarely perfectly match the actual outcomes. For example, a formula that merely averages (or relies on averages of) historical outcomes to generate a prediction is unlikely to accurately predict sudden bursts or increases in content request traffic through HPCDCs. Therefore, content delivery exchange 120 could plan for that possibility by modifying a process for determining a prediction of resource usage. Accordingly, in an embodiment, a prediction of resource usage is modified by a prediction buffer value representing a buffer or error. For example, a prediction of resource usage associated with a content delivery campaign and a HPCDC may be 23.3 and a prediction buffer value may be 3%. The resulting modified prediction may then be 23.3*(1+0.03)=23.999. A single prediction buffer value may be specified for multiple (e.g., all) content delivery campaigns, such as a default prediction buffer. Alternatively, different content delivery campaigns may be associated with different prediction buffers.

In an embodiment, a prediction buffer is automatically adjusted based on actual resource usage. For example, if a prediction of resource usage under predicted actual resource usage by at least 4% over the last week, then the prediction buffer may be increased by 0.04.

Multiple Lower Priority Content Delivery Channels

The foregoing examples illustrate a scenario involving two content delivery channels where there is a single HPCDC and a single LPCDC. In an embodiment, there are multiple LPCDCs, which means there are at least three CDCs. In this embodiment, one LPCDC has a lower priority than another LPCDC. In this embodiment, processing content requests from different LPCDCs is similar as before, expect multiple predictions of resource usage may be considered in determining whether to respond to a content request from a LPCDC that is lower in priority than multiple other content delivery channels.

For example, channel C1 has a higher priority than channel C2, which has a higher priority than channel C3. To calculate an allocated resource amount for channel C3, two predictions are determined: one for channel C1 and one for channel C2. A formula for calculating the allocated resource amount for channel C3 may be as follows:

Resource Limit−Max($C1\_actual$,(1+$e$%)$C1\_pred$)−
   Max($C2\_actual$,(1+$e$%)$C2\_pred$)

where $C1\_actual$ is actual resource usage by the corresponding campaign through channel C1, $C2\_actual$ is actual resource usage by the corresponding campaign through channel C2, $C1\_pred$ is a prediction of resource usage by the corresponding campaign through channel C1, and $C2\_pred$ is a prediction of resource usage by the corresponding campaign through channel C2.

If actual resource data is not available for either channel C1 or channel C2, then the corresponding maximum operation is replaced with the second parameter in the maximum operation. For example, if actual resource data is available for channel C1, but not channel C2, then the above formula may be changed to the following:

Resource Limit−Max($C1\_actual$,(1+$e$%)$C1\_pred$)−
   ((1+$e$%)$C2\_pred$)

In an embodiment, if there are multiple buffer values (i.e., $e$ %), each applied to a different prediction for a different channel, the buffer values may be the same (as implied above) or may be different. For example, a buffer value applied to the prediction of resource usage for channel C1 may be higher than a buffer value applied to the prediction of resource usage for channel C2.

Over/Under Allotment

As alluded to previously, in an embodiment, a content delivery campaign has a lifespan (or a start date and end date or criteria that indicates when to end) and multiple cycles within that lifespan, where each cycle has a different resource limit. For example, a content delivery channel has a total resource limit of 1000 units and a daily maximum of 90 units. If the daily maximum is not reached in one day (or time cycle), then the (absolute) difference is added to the next day's daily maximum. For example, if the actual resource usage was 85 units, then the next day's daily maximum becomes 95 units (i.e., 90+(90−85)). Conversely, if the daily maximum is exceeded in one day, then the (absolute) difference is subtracted from the next day's daily maximum. For example, if the actual resource usage was 100 units, then the next day's daily maximum becomes 80 units (i.e., 90−(100−90)). Either difference may change the allocated budget for a LPCDC.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
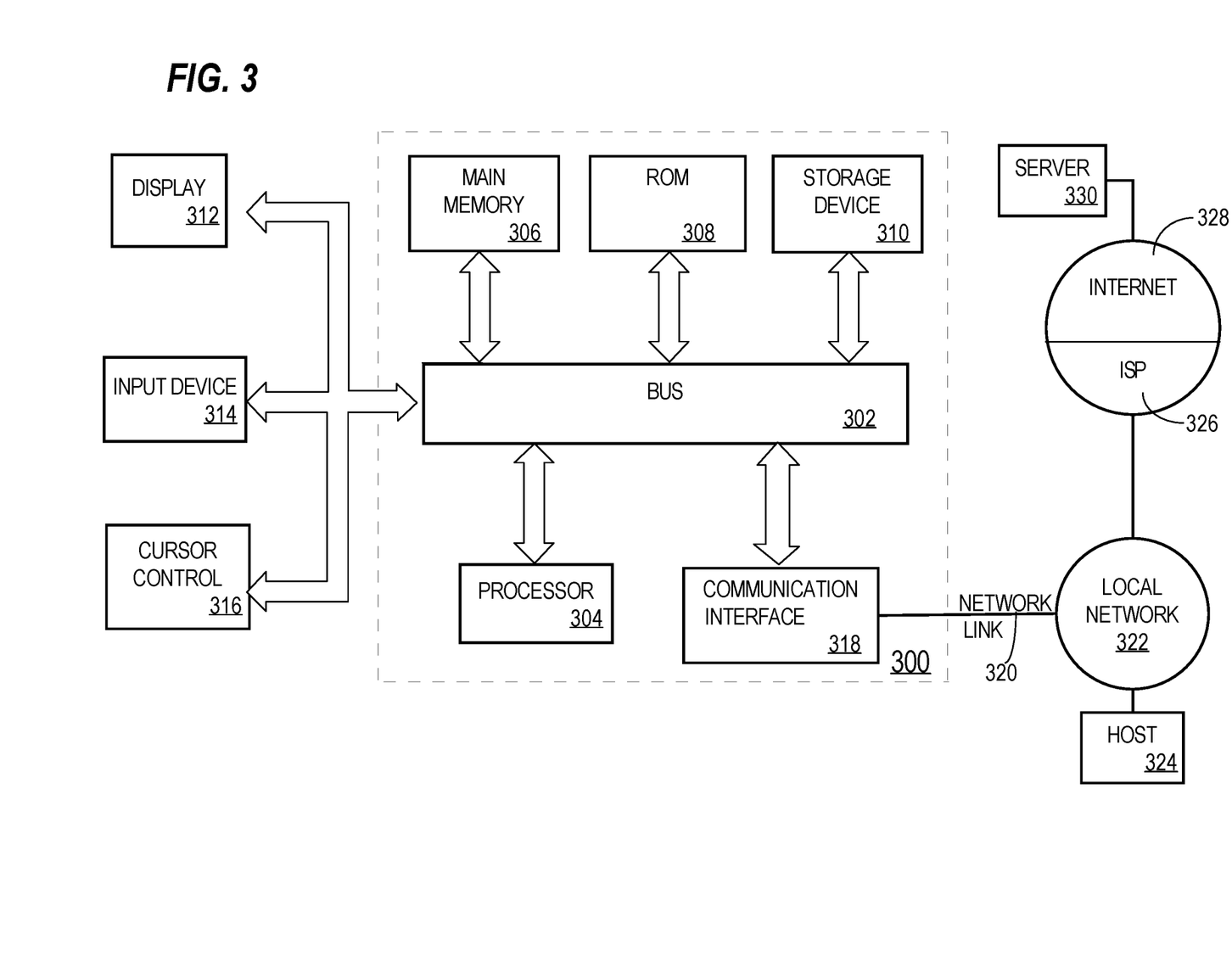
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
   determining a resource limit that is associated with a content delivery campaign of a plurality of content delivery campaigns;
   determining a prediction of resource usage that is associated with the content delivery campaign and a first content delivery channel of a plurality of content delivery channels;
   receiving a content request through a second content delivery channel, of the plurality of content delivery channels, that is different than the first content delivery channel;

in response to receiving the content request:
    identifying, based on data contained within the content request, the content delivery campaign;
    determining, based on the resource limit and the prediction of resource usage associated with the content delivery campaign and the first content delivery channel, whether to respond to the content request with campaign data associated with the content delivery campaign;
    determining to not respond to the content request with the campaign data associated with the content delivery campaign.

2. The one or more storage media of claim 1, wherein determining whether to respond to the content request is further based on a current resource usage associated with the second content delivery channel.

3. The one or more storage media of claim 1, wherein the instructions, when executed by the one or more processors, further comprise:
    comparing (1) the resource limit to (2) a product of a buffer value and the prediction of resource usage associated with the first content delivery channel.

4. The one or more storage media of claim 3, wherein the instructions, when executed by the one or more processors, further cause:
    determining an actual resource usage that is associated with the content delivery campaign;
    determining a difference between the actual resource usage and the resource limit;
    based on the difference, adjusting the buffer value.

5. The one or more storage media of claim 1, wherein the instructions, when executed by the one or more processors, further cause:
    determining a second prediction of resource usage that is associated with the content delivery campaign and the second content delivery channel;
    receiving a second content request through a third content delivery channel, of the plurality of content delivery channels, that is different than the first content delivery channel and the second content delivery channel;
    in response to receiving the second content request:
        identifying the content delivery campaign;
        determining, based on the resource limit, the prediction of resource usage, and the second prediction of resource usage, whether to respond to the second content request.

6. The one or more storage media of claim 1, wherein the instructions, when executed by the one or more processors, further cause:
    determining an actual resource usage that is associated with the content delivery campaign and the second content delivery channel;
    wherein determining whether to respond to the content request with the campaign data associated with the content delivery campaign is further based on the actual resource usage.

7. The one or more storage media of claim 1, wherein the instructions, when executed by the one or more processors, further cause:
    receiving a second content request through the first content delivery channel;
    in response to receiving the second content request:
        identifying, based on second data contained within the second content request, the content delivery campaign from among the plurality of content delivery campaigns;
        determining an actual resource usage that is associated with the content delivery campaign and the first content delivery channel;
        determining to respond to the second content request with second campaign data associated with the content delivery campaign if the resource limit is higher than the actual resource usage;
        wherein determining to respond is not based on any prediction of resource usage.

8. The one or more storage media of claim 1, wherein:
    determining the prediction of resource usage that is associated with the content delivery campaign and the first content delivery channel comprises generating the prediction of resource usage using a mathematical model that was trained based on actual resource usage of a second plurality of content delivery campaigns that completed prior to generation of the mathematical model.

9. The one or more storage media of claim 8, wherein the instructions, when executed by the one or more processors, further cause:
    generating the mathematical model based on a plurality of features that include one or more of: type of campaign, historical usage data, geography of target audience, industry associated with a content provider that initiated the corresponding content delivery campaign, or day of week of the prediction.

10. The one or more storage media of claim 1, wherein the content delivery campaign is a first content delivery campaign, wherein the instructions, when executed by the one or more processors, further cause:
    determining a second resource limit that is associated with a second content delivery campaign, of the plurality of content delivery campaigns, that is different than the first content delivery campaign;
    determining a second prediction of resource usage that is associated with the second content delivery campaign and the first content delivery channel;
    in response to receiving the content request:
        identifying, based on the data contained within the content request, the second content delivery campaign;
        determining, based on the second resource limit and the second prediction of resource usage associated with the second content delivery campaign and the first content delivery channel, whether to respond to the content request with second campaign data associated with the second content delivery campaign.

11. A method comprising:
    determining a resource limit that is associated with a content delivery campaign of a plurality of content delivery campaigns;
    determining a prediction of resource usage that is associated with the content delivery campaign and a first content delivery channel of a plurality of content delivery channels;
    receiving a content request through a second content delivery channel, of the plurality of content delivery channels, that is different than the first content delivery channel;
    in response to receiving the content request:
        identifying, based on data contained within the content request, the content delivery campaign;
        determining, based on the resource limit and the prediction of resource usage associated with the content delivery campaign and the first content delivery channel, whether to respond to the content request with campaign data associated with the content delivery campaign;

determining to respond to the content request with the campaign data associated with the content delivery campaign;

wherein the method is performed by one or more computing devices.

12. The method of claim 11, wherein determining whether to respond to the content request is further based on a current resource usage associated with the second content delivery channel.

13. The method of claim 11, further comprising:
comparing (1) the resource limit to (2) a product of a buffer value and the prediction of resource usage associated with the first content delivery channel.

14. The method of claim 13, further comprising:
determining an actual resource usage that is associated with the content delivery campaign;
determining a difference between the actual resource usage and the resource limit;
based on the difference, adjusting the buffer value.

15. The method of claim 11, further comprising:
determining a second prediction of resource usage that is associated with the content delivery campaign and the second content delivery channel;
receiving a second content request through a third content delivery channel, of the plurality of content delivery channels, that is different than the first content delivery channel and the second content delivery channel;
in response to receiving the second content request:
identifying the content delivery campaign;
determining, based on the resource limit, the prediction of resource usage, and the second prediction of resource usage, whether to respond to the second content request.

16. The method of claim 11, further comprising:
determining an actual resource usage that is associated with the content delivery campaign and the second content delivery channel;
wherein determining whether to respond to the content request with the campaign data associated with the content delivery campaign is further based on the actual resource usage.

17. The method of claim 11, further comprising:
receiving a second content request through the first content delivery channel;
in response to receiving the second content request:
identifying, based on second data contained within the second content request, the content delivery campaign from among the plurality of content delivery campaigns;
determining an actual resource usage that is associated with the content delivery campaign and the first content delivery channel;
determining to respond to the second content request with second campaign data associated with the content delivery campaign if the resource limit is higher than the actual resource usage;
wherein determining to respond is not based on any prediction of resource usage.

18. The method of claim 11, wherein:
determining the prediction of resource usage that is associated with the content delivery campaign and the first content delivery channel comprises generating the prediction of resource usage using a mathematical model that was trained based on actual resource usage of a second plurality of content delivery campaigns that completed prior to generation of the mathematical model.

19. The method of claim 18, further comprising:
generating the mathematical model based on a plurality of features that include one or more of: type of campaign, historical usage data, geography of target audience, industry associated with a content provider that initiated the corresponding content delivery campaign, or day of week of the prediction.

20. The method of claim 11, wherein the content delivery campaign is a first content delivery campaign, further comprising:
determining a second resource limit that is associated with a second content delivery campaign, of the plurality of content delivery campaigns, that is different than the first content delivery campaign;
determining a second prediction of resource usage that is associated with the second content delivery campaign and the first content delivery channel;
in response to receiving the content request:
identifying, based on the data contained within the content request, the second content delivery campaign;
determining, based on the second resource limit and the second prediction of resource usage associated with the second content delivery campaign and the first content delivery channel, whether to respond to the content request with second campaign data associated with the second content delivery campaign.

* * * * *